(12) United States Patent
Goel et al.

(10) Patent No.: US 10,582,321 B2
(45) Date of Patent: Mar. 3, 2020

(54) IDENTIFICATION OF UNMANNED AERIAL VEHICLES BASED ON AUDIO SIGNATURES

(71) Applicant: Verizon Patent and Licensing Inc., Arlington, VA (US)

(72) Inventors: Gaurav Goel, Los Gatos, CA (US); Kiran Naiga, Mountain View, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 227 days.

(21) Appl. No.: 15/280,641

(22) Filed: Sep. 29, 2016

(65) Prior Publication Data
US 2018/0091908 A1 Mar. 29, 2018

(51) Int. Cl.
| | |
|---|---|
| *H04R 29/00* | (2006.01) |
| *B64C 39/02* | (2006.01) |
| *G10L 25/48* | (2013.01) |
| *G08G 5/00* | (2006.01) |
| *G10L 25/51* | (2013.01) |
| *G10L 17/26* | (2013.01) |

(52) U.S. Cl.
CPC .......... *H04R 29/00* (2013.01); *B64C 39/024* (2013.01); *G08G 5/0013* (2013.01); *G08G 5/0026* (2013.01); *G08G 5/0069* (2013.01); *G08G 5/0082* (2013.01); *G10L 17/26* (2013.01); *G10L 25/48* (2013.01); *G10L 25/51* (2013.01); *B64C 2201/146* (2013.01); *G08G 5/0034* (2013.01)

(58) Field of Classification Search
CPC ........ B64C 2201/024; B64C 2201/027; B64C 2201/108; B64C 2201/128; B64C 2201/141; B64C 39/024
USPC ............................................ 381/86; 701/2–3
See application file for complete search history.

(56) References Cited

U.S. PATENT DOCUMENTS

| | | | |
|---|---|---|---|
| 9,170,117 B1* | 10/2015 | Abuelsaad | G01C 21/34 |
| 2015/0302858 A1* | 10/2015 | Hearing | G10L 19/00 381/58 |
| 2016/0321901 A1* | 11/2016 | Desoyza | A61B 5/747 |
| 2017/0169713 A1* | 6/2017 | Gong | G06F 16/29 |
| 2017/0234724 A1* | 8/2017 | Naguib | G01H 3/08 367/117 |

* cited by examiner

*Primary Examiner* — George C Monikang (57) ABSTRACT

A device may receive audio information that includes an audio signature. The device may identify an unmanned aerial vehicle (UAV) based on the audio signature. The UAV may be identified based on a UAV identifier that is encoded into or determined based on the audio signature. The device may obtain profile information associated with the UAV based on the UAV identifier. The device may provide the profile information.

20 Claims, 6 Drawing Sheets

IDENTIFICATION OF UNMANNED AERIAL VEHICLES BASED ON AUDIO SIGNATURES

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of applications, such as police surveillance, firefighting, security work (e.g., surveillance of pipelines), surveillance of farms, commercial purposes, etc.

DETAILED DESCRIPTION OF PREFERRED EMBODIMENTS

The following detailed description of example implementations refers to the accompanying drawings. The same reference numbers in different drawings may identify the same or similar elements.

UAVs may be used for a variety of purposes or applications. For example, UAVs may be used for package delivery, surveillance, geographic information systems (GIS), photography, or the like. Different UAVs may be associated with different components to perform such tasks. For example, UAVs may include a variety of sensors, payloads, or the like. UAVs also may navigate based on a flight path that identifies expected locations, time, speeds, or the like, associated with the UAVs.

The purpose of a UAV may not be clear to an entity that observes the UAV in flight. For example, an individual may not be able to tell whether a UAV is equipped with sensors (e.g., cameras) when the UAV flies over the individual's property. It also may be difficult to tell when a UAV is located in an authorized area. For example, it may be difficult to tell when a UAV is in an area that is included in a predetermined flight path of the UAV. An individual also may want additional information regarding the UAV. For example, an individual may want to know the purpose of the UAV, a speed/flight height of the UAV, which entity owns or implements the UAV, or the like.

In implementations described herein, a client device may register a UAV with a UAV services platform. The registration process may include providing profile information for the UAV to the UAV services platform. The UAV services platform may assign a UAV identifier to the UAV, and cause the UAV to emit audio based on an audio signature that is generated based on the UAV identifier (e.g., using an onboard speaker of the UAV). A user device may record or detect the audio signature, and provide the audio signature to the UAV services platform. The UAV services platform may identify the UAV based on the audio signature, and may provide the profile information for the UAV to the user device. The profile information may identify the UAV, the entity that implements the UAV, a flight plan of the UAV, sensors aboard the UAV, or the like.

By identifying the UAV based on the audio signature, the UAV services platform permits UAVs to be identified in the field, permits UAVs to be identified without visual identification, improves adherence of UAVs to flight paths, and permits verification of UAV-provided location information (based on a location of the user device). When the UAV services platform identifies the UAV based on the audio signature, and provides the profile information for the UAV to the user device, the UAV services platform also permits identification of UAVs at a longer range than some other methods of identification, such as near-field communication (NFC), identifiers displayed on the UAV, or the like.

Figure 1A:
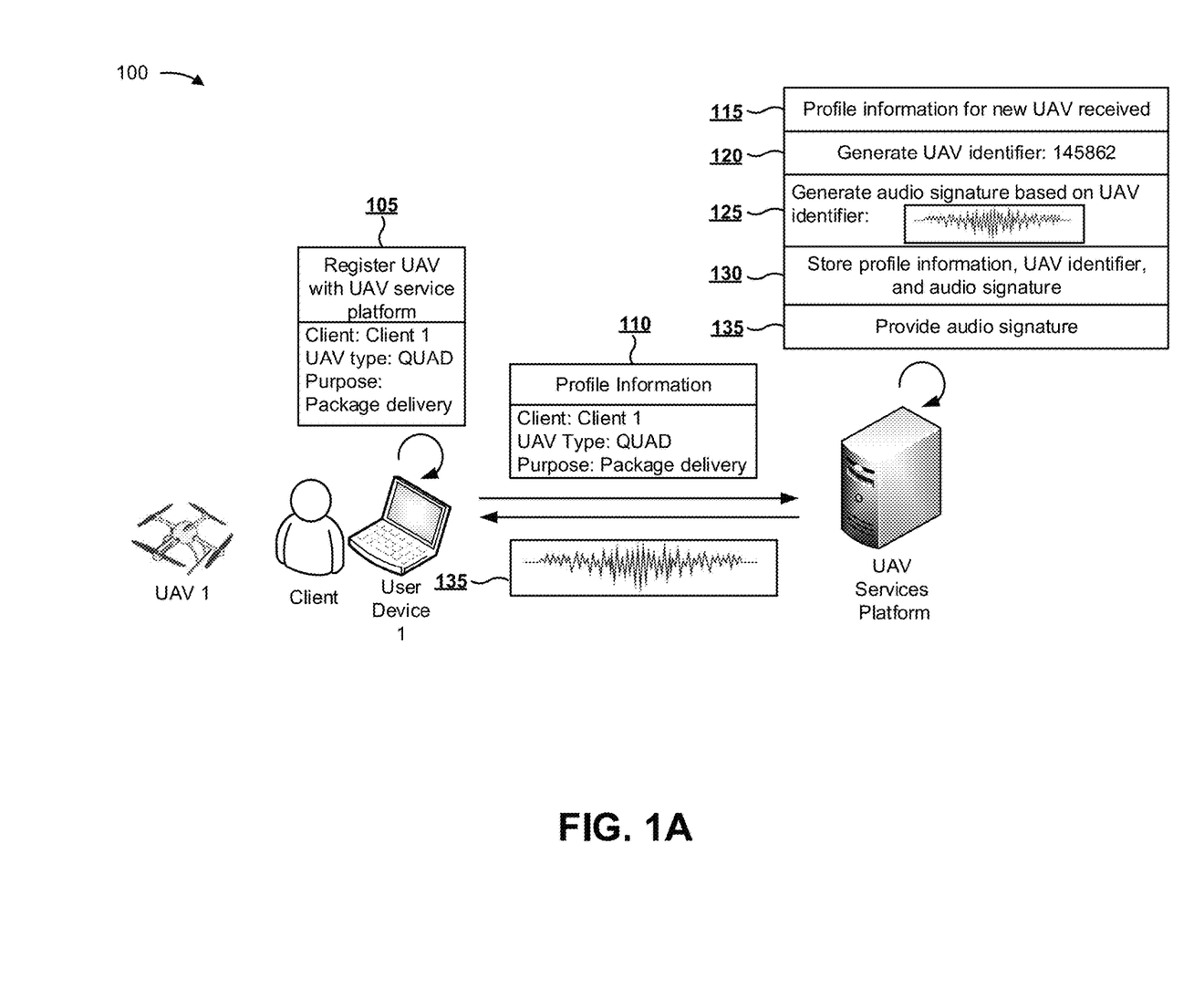
FIGS. 1A and 1B are diagrams of an overview of an example implementation described herein.
Figure 1B:
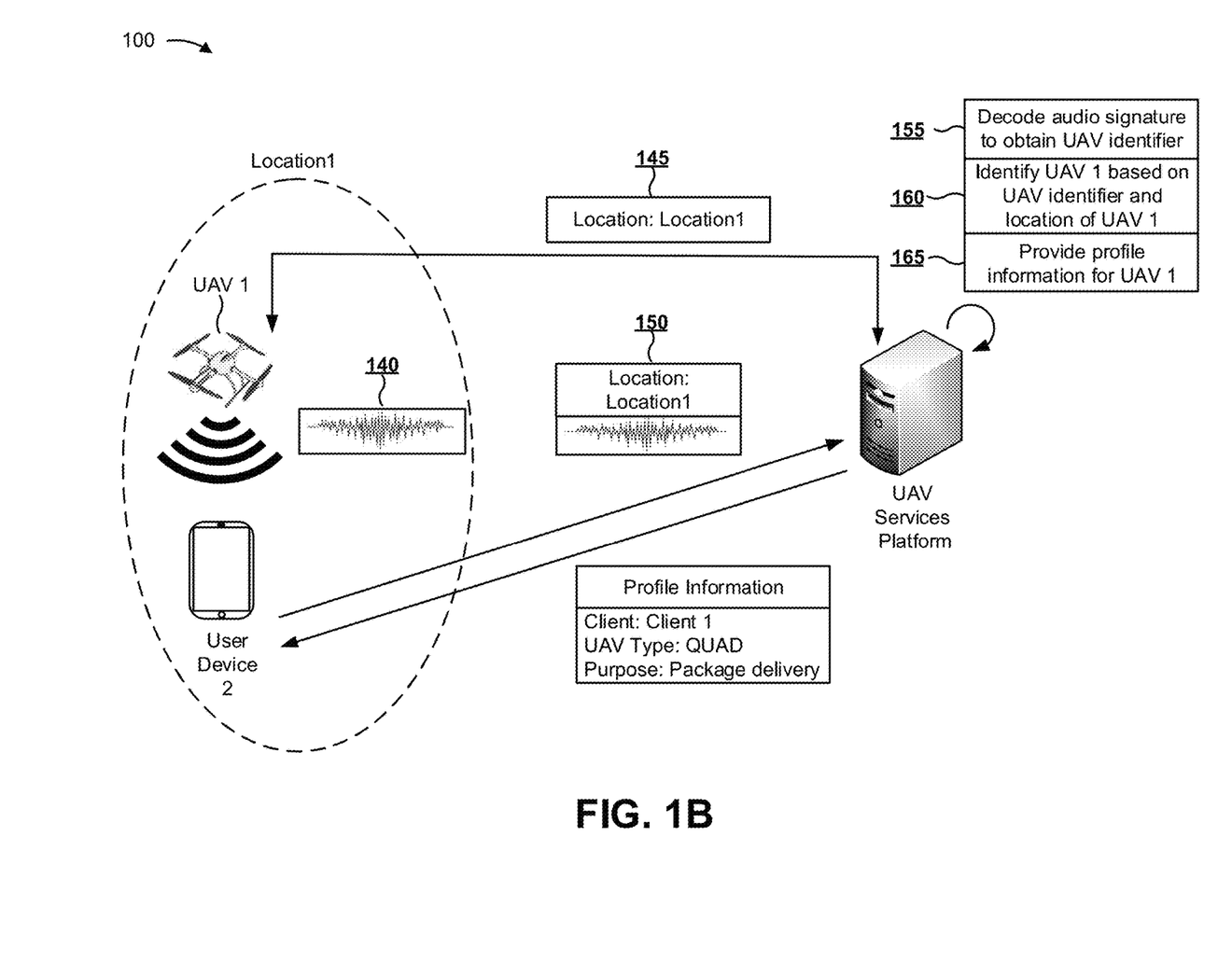

FIGS. 1A and 1B are diagrams of an overview of an example implementation 100 described herein. As shown in FIGS. 1A and 1B, example implementation 100 includes UAV 1, a user device 1 associated with a client, a UAV services platform, and a user device 2. User device 1 may be associated with a client that is associated with UAV 1 (e.g., an entity that implements UAV 1, an entity that configures UAV 1, or the like). User device 2 may include one or more devices capable of receiving, generating, storing, processing, and/or providing information associated with UAV 1, such as an audio signature generated by UAV 1, profile information associated with UAV 1, or the like.

As shown in FIG. 1A, and by reference number 105, user device 1 may receive an interaction with an interface to register UAV 1 with the UAV services platform. The registration information may include profile information associated with UAV 1. The profile information may identify the client associated with UAV 1, a type associated with UAV 1, and a purpose associated with UAV 1.

As shown by reference number 110, user device 1 may provide the profile information to the UAV services platform. The profile information may identify attributes of UAV 1. For example, the profile information may identify the client associated with UAV 1 (e.g., client 1), the type associated with UAV 1 (e.g., QUAD, corresponding to a quad propeller UAV), and the purpose for UAV 1 (e.g., package delivery).

As shown by reference number 115, the UAV services platform may receive the profile information for a new (e.g., unregistered) UAV from user device 1. The new UAV may be UAV 1. As shown by reference number 120, the UAV services platform may generate a UAV identifier for UAV 1, and may assign the UAV identifier to UAV 1. For example, the UAV identifier for UAV 1 may be 145862, and the UAV services platform may assign 145862 to UAV 1.

As shown by reference number 125, the UAV services platform may generate an audio signature for UAV 1 based on the UAV identifier of 145862. For example, the UAV services platform may modulate a base audio signature, based on the UAV identifier, to generate the audio signature for UAV 1.

As shown by reference number 130, the UAV services platform may store the profile information and/or information that identifies the audio signature associated with UAV 1. For example, the UAV services platform may store the profile information, the UAV identifier, and/or the audio signature associated with UAV 1. As shown by reference number 135, the UAV services platform may provide the audio signature for UAV 1 to user device 1 and/or UAV 1. This may permit configuration of UAV 1 to emit audio based on the audio signature during operation of UAV 1, thereby enabling identification of UAV 1 based on the audio signature.

As shown in FIG. 1B, UAV 1 and user device 2 may be located at a location 1. As shown by reference number 140, UAV 1 may emit audio based on the audio signature associated with UAV 1 (e.g., from an onboard speaker of UAV 1). User device 2 may record the audio emitted by UAV 1.

As shown by reference number 145, in some implementations, UAV 1 may provide location information to the UAV services platform. For example, the UAV services platform may control UAV 1, and may determine the location information for UAV 1 based on controlling UAV 1. As another example, the UAV services platform may request location information from UAV 1. As shown by reference number 150, user device 2 may provide location information and the audio signature to the UAV services platform. The UAV services platform may receive the audio information and/or location information from user device 2 and/or UAV 1.

As shown by reference number 155, the UAV services platform may then process or decode the audio signature to obtain the UAV identifier associated with UAV 1. As shown by reference number 160, the UAV services platform may identify UAV 1 based on the UAV identifier, the location of UAV 1, and/or the location of user device 2. For example, the UAV services platform may compare the location of user device 2 to the location of user device 1, and/or may identify UAV 1 based on the stored UAV identifier and profile information associated with UAV 1. The UAV services platform also may obtain profile information associated with UAV 1 based on the UAV identifier and the location information.

As shown by reference number 165, the UAV services platform may provide the profile information for UAV 1 to the user device. The profile information may identify that the client 1 is the client associated with UAV 1, that UAV 1 is a QUAD type UAV, and that the purpose of UAV 1 is package delivery.

When the UAV services platform identifies UAV 1 based on the audio signature, and provides the profile information for UAV 1 to user device 2, the UAV services platform permits UAVs to be identified in the field without visual identification, improves adherence of UAV 1 to flight paths, and permits verification of UAV 1—provided location information (based on a location of user device 2). When the UAV services platform identifies UAV 1 based on the audio signature, and provides the profile information for UAV 1 to user device 2, the UAV services platform also permits identification of UAV 1 at a longer range than some other methods of identification, such as near-field communication (NFC), identifiers displayed on UAV 1, or the like.

As indicated above, FIGS. 1A and 1B are provided merely as examples. Other examples are possible and may differ from what was described with regard to FIGS. 1A and 1B.

Figure 2:
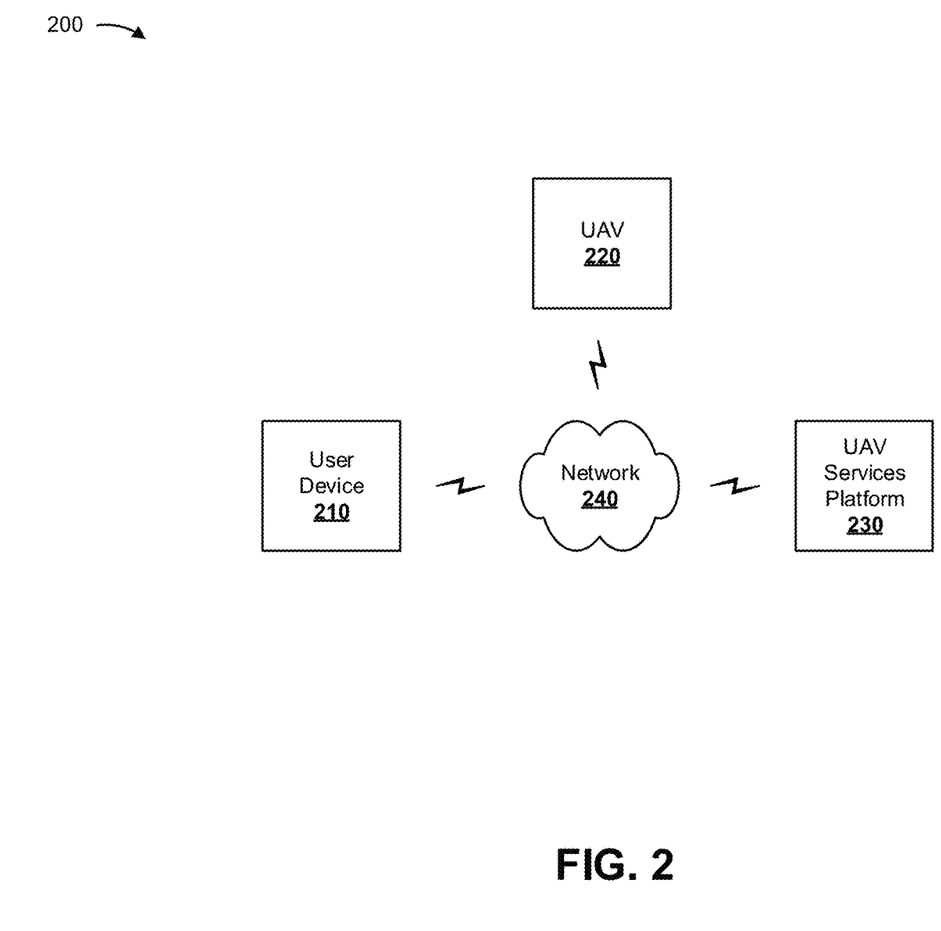
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a UAV 220, a UAV services platform 230, and a network 240. Devices of environment 200 may interconnect via wired connections, wireless connections, or a combination of wired and wireless connections.

User device 210 includes one or more devices capable of receiving, generating, storing, processing, and/or providing information associated with UAV 220, such as an audio signature generated by UAV 220, profile information associated with UAV 220, or the like. For example, user device 210 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

UAV 220 includes an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220, to obtain information (e.g., photos, videos, audio recordings, etc.), or to perform other sensing tasks.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with network 240 and/or other UAV devices 220; determine a flight path or flight plan for UAV 220 based on constraints, such as obstacles or fuel requirements; determine an optimal control maneuver in order to follow a given path or go from one location to another location; regulate a trajectory of UAV 220; generate one or more flight paths for UAV 220, etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

In some implementations, UAV 220 may be controlled by UAV services platform 230 via communications with UAV services platform 230. Additionally, or alternatively, UAV 220 may be controlled by the computational resources of UAV 220. Additionally, or alternatively, UAV 220 may controlled by another UAV 220 via communications with the other UAV 220. Additionally, or alternatively, UAV 220 may be controlled by a combination of UAV services platform 230, the computational resources of UAV 220, and/or the other UAV 220.

UAV services platform 230 includes one or more personal computers, one or more workstation computers, one or more server devices, one or more virtual machines (VMs) provided in a cloud computing network, or one or more other types of computation and communication devices. In some implementations, UAV services platform 230 may be associated with a service provider that manages and/or operates network 240, such as, for example, a telecommunication service provider, a television service provider, an Internet service provider, etc.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
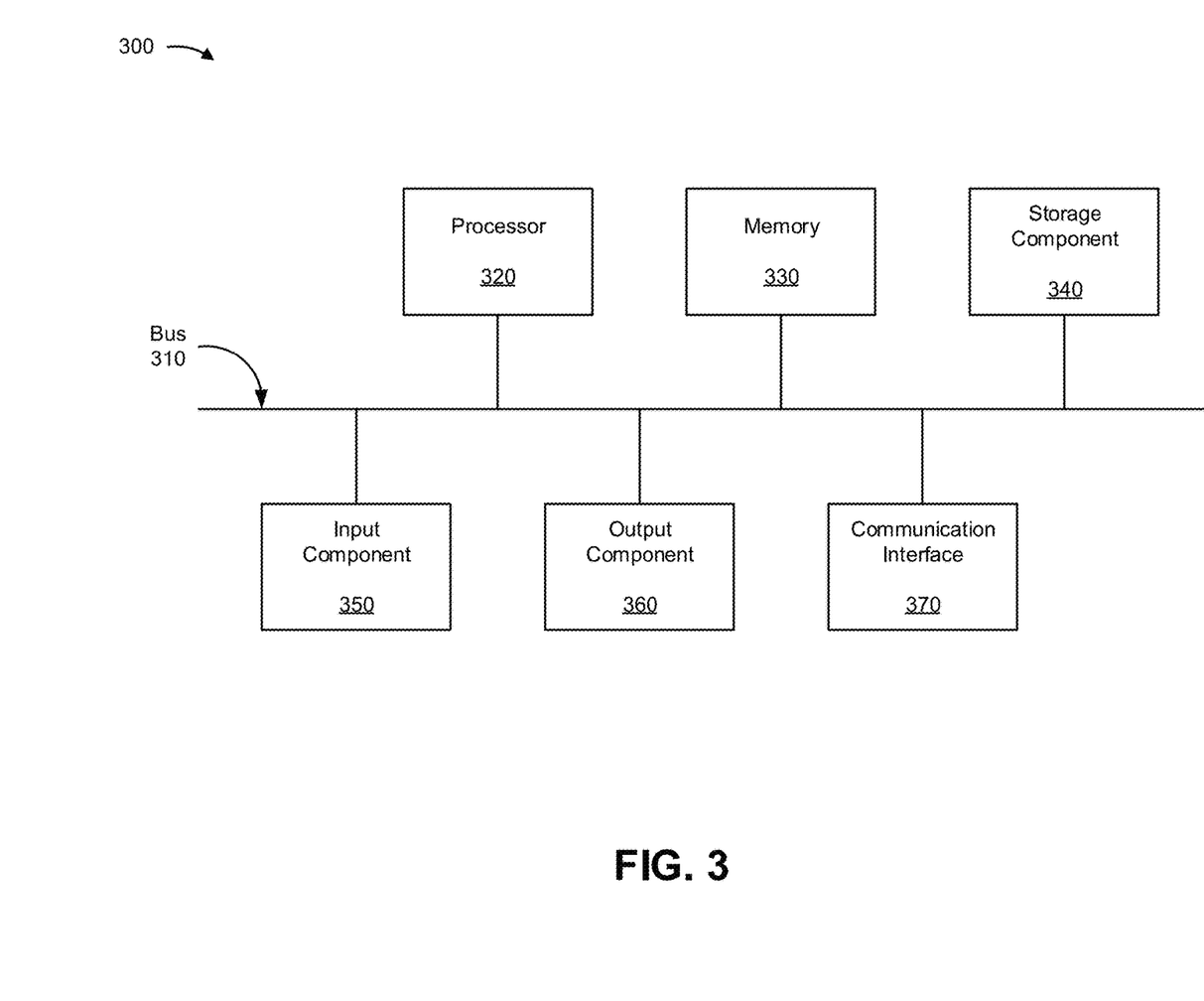
FIG. 3 is a diagram of example components of one or more devices of FIG. 2.

FIG. 3 is a diagram of example components of a device 300. Device 300 may correspond to user device 210, UAV 220, and/or UAV services platform 230. In some implementations, user device 210, UAV 220, and/or UAV services platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
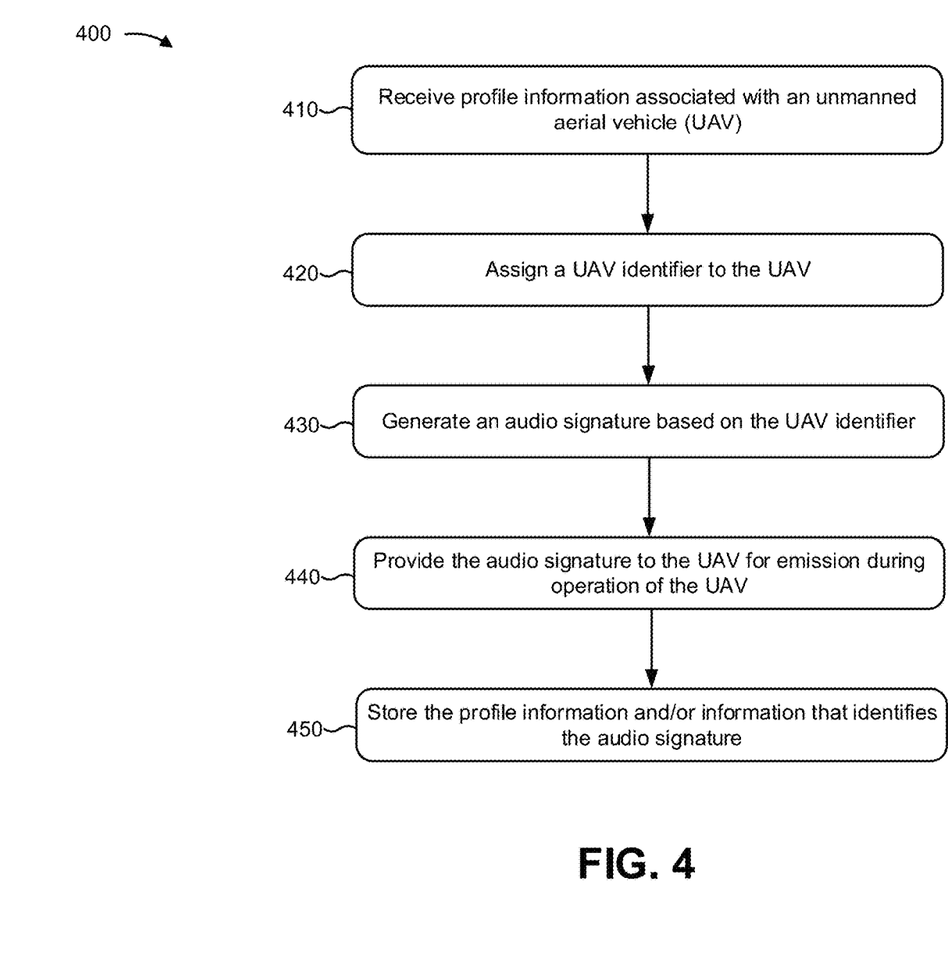
FIG. 4 is a flow chart of an example process for assigning an audio signature to a UAV for identification of profile information associated with the UAV.

FIG. 4 is a flow chart of an example process 400 for assigning an audio signature to a UAV for identification of profile information associated with the UAV. In some implementations, one or more process blocks of FIG. 4 may be performed by UAV services platform 230. In some implementations, one or more process blocks of FIG. 4 may be performed by another device or a group of devices separate from or including UAV services platform 230, such as user device 210 and/or UAV 220.

As shown in FIG. 4, process 400 may include receiving profile information associated with an unmanned aerial vehicle (UAV) (block 410). For example, UAV services platform 230 may receive profile information associated with UAV 220 (e.g., as part of a registration process for UAV 220). In some implementations, UAV services platform 230 may receive the profile information from an entity associated with UAV 220. For example, UAV services platform 230 may receive the profile information from an entity that implements UAV 220, from an entity that configures UAV 220, or the like.

In some implementations, the profile information may identify attributes of UAV 220. For example, the profile information may identify an entity associated with UAV 220, an entity that owns UAV 220 (e.g., a private individual or company), sensors associated with or activated by UAV 220, a flight floor and/or ceiling associated with UAV 220, a purpose of UAV 220, a task associated with UAV 220, a job associated with UAV 220, or the like. Additionally, or alternatively, the profile information may include information that identifies a schedule associated with UAV 220, a flight plan of UAV 220, an area in which UAV 220 is permitted and/or not permitted to operate, an area in which UAV 220 has previously been observed, a make or model of UAV 220, a type of UAV 220, cargo carried by UAV 220, maximum speeds for UAV 220, a distance that UAV 220 is capable of traveling without recharging or refueling, radio frequencies for contacting UAV 220 and/or the operator of UAV 220, and/or the like.

In some implementations, UAV services platform 230 may receive the profile information as part of a registration process for UAV 220. For example, UAV services platform 230 may offer services for UAV 220 (e.g., collision avoidance, secure communication, flight tracking, or the like). In some implementations, to utilize these services, UAV 220 may need to be registered with UAV services platform 230.

In some implementations, the profile information may be automatically determined. For example, based on UAV 220 connecting to UAV services platform 230, UAV services platform 230 may obtain configuration information from UAV 220 that identifies sensors and/or a physical configuration of UAV 220, and may automatically determine profile information for UAV 220.

In some implementations, the profile information may be provided by a user. For example, a user interface of user device 210 may receive an interaction from the user to provide profile information. In some implementations, the user may be associated with an entity that implements, manages, or owns UAV 220. In some implementations, the user may be an individual that observes UAV 220 in the field. For example, if a user observes UAV 220 in a particular location, the profile information provided by the user may indicate that UAV 220 has been observed in the particular location. Thus, a profile for UAV 220 may be configured based on field observations associated with UAV 220, which permits more accurate identification of movement and/or location of UAV 220.

As further shown in FIG. 4, process 400 may include assigning a UAV identifier to the UAV (block 420). For example, UAV services platform 230 may assign a UAV identifier to UAV 220 based on receiving the profile information associated with UAV 220. In some implementations, the UAV identifier may include a unique identifier (e.g., a group of one or more characters). In such cases, the UAV identifier may be randomly generated. In some implementations, the UAV identifier may be specified or determined as part of the profile information (e.g., based on a user specification of the UAV identifier, based on generation of the UAV identifier using the profile information, etc.). In some implementations, the UAV identifier may include or be encoded with information regarding UAV 220 (e.g., part of or all of the profile information associated with UAV 220). In this way, user device 210 may be permitted to decode the UAV identifier to determine the profile information, thereby conserving computational resources of UAV services platform 230.

As further shown in FIG. 4, process 400 may include generating an audio signature based on the UAV identifier (block 430). For example, UAV services platform 230 may generate an audio signature associated with UAV 220 based on the UAV identifier. In some implementations, UAV services platform 230 may encode the UAV identifier into the audio signature. For example, UAV services platform 230 may modulate a base audio signature, based on the UAV identifier, to generate a modulated audio signature that can identify the UAV identifier. In some implementations, the profile information may be encoded into the audio signal (e.g., via the UAV identifier).

In some implementations, UAV 220 may emit audio based on the audio signature to permit identification of UAV 220 and/or identification of the profile information associated with UAV 220 based on the UAV identifier. For example, UAV 220 may have an onboard speaker that may emit audio based on the audio signature. In some implementations, the audio signature may be associated with a frequency outside the scope of human hearing. In this way, irritation and/or noise generated by UAV 220 are reduced.

In some implementations, UAV services platform 230 may generate the audio signature based on other sound generated by UAV 220. For example, UAV services platform 230 may generate the audio signature to compensate for or include engine noise, rotor noise, wind noise, and/or other sounds generated by operation of UAV 220. By taking engine noise, rotor noise, and/or other sounds into account, UAV services platform 230 improves the accuracy of the audio signature. Additionally, or alternatively, other noise generated by UAV 220 may provide additional information associated with UAV 220. For example, the make and model of UAV 220 may be determined based on the engine noise. By permitting information associated with the make and model of UAV 220 to be determined based on engine noise, rotor noise, or the like, the amount of information that is to be stored as profile information by UAV services platform 230 is reduced.

In some implementations, UAV 220 may generate the audio signature based on the UAV identifier. For example, UAV services platform 230 may provide the UAV identifier to UAV 220, and UAV 220 may generate the audio signature based on the UAV identifier (e.g., by modulating a base audio signature to generate a modulated audio signature that identifies the UAV identifier). In this way, UAV services platform 230 saves processor and/or storage resources that would otherwise be used by UAV services platform 230 to generate and store the audio signature.

As further shown in FIG. 4, process 400 may include providing the audio signature to the UAV for emission during operation of the UAV (block 440). For example, UAV services platform 230 may provide information identifying the audio signature to UAV 220 for broadcast during operation of UAV 220, and UAV 220 may emit audio based on the audio signature during operation of UAV 220 (e.g., using a speaker associated with UAV 220). In some implementations, UAV services platform 230 may provide the audio signature to a user device 210 associated with UAV 220 (e.g., to permit configuration of UAV 220 to emit audio based on the audio signature). In some implementations, UAV services platform 230 may provide information indicating a volume at which to emit audio associated with the audio signature (e.g., based on ambient noise associated with UAV 220, based on a desired range at which the audio is to be perceptible, etc.).

As further shown in FIG. 4, process 400 may include storing the profile information and/or information that identifies the audio signature (block 450). For example, UAV services platform 230 may store the profile information and/or information that identify the audio signature associated with UAV 220. In some implementations, UAV services platform 230 may store or have access to a data structure that identifies the profile information, the UAV identifier, and/or the audio signature. By storing profile information and/or information identifying the audio signature, UAV services platform 230 may permit identification of UAV 220 based on the audio signature.

In some implementations, UAV services platform 230 may store the audio signature. When services platform 230 stores the audio signature, the identification of profile information corresponding to the audio signature may be performed without UAV services platform 230 having to decode the audio signature. In this way, UAV services platform 230 saves processor resources.

In some implementations, UAV services platform 230 may store a UAV identifier corresponding to the profile information and/or the audio signature. When UAV services platform 230 stores the UAV identifier (rather than the profile information and/or the audio signature), UAV services platform 230 uses less storage space than when storing the audio signature. Also, when user device 210 decodes the audio signature to obtain the UAV identifier, UAV services platform 230 conserves processor resources that would otherwise be used by UAV services platform 230 to decode the UAV identifier.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
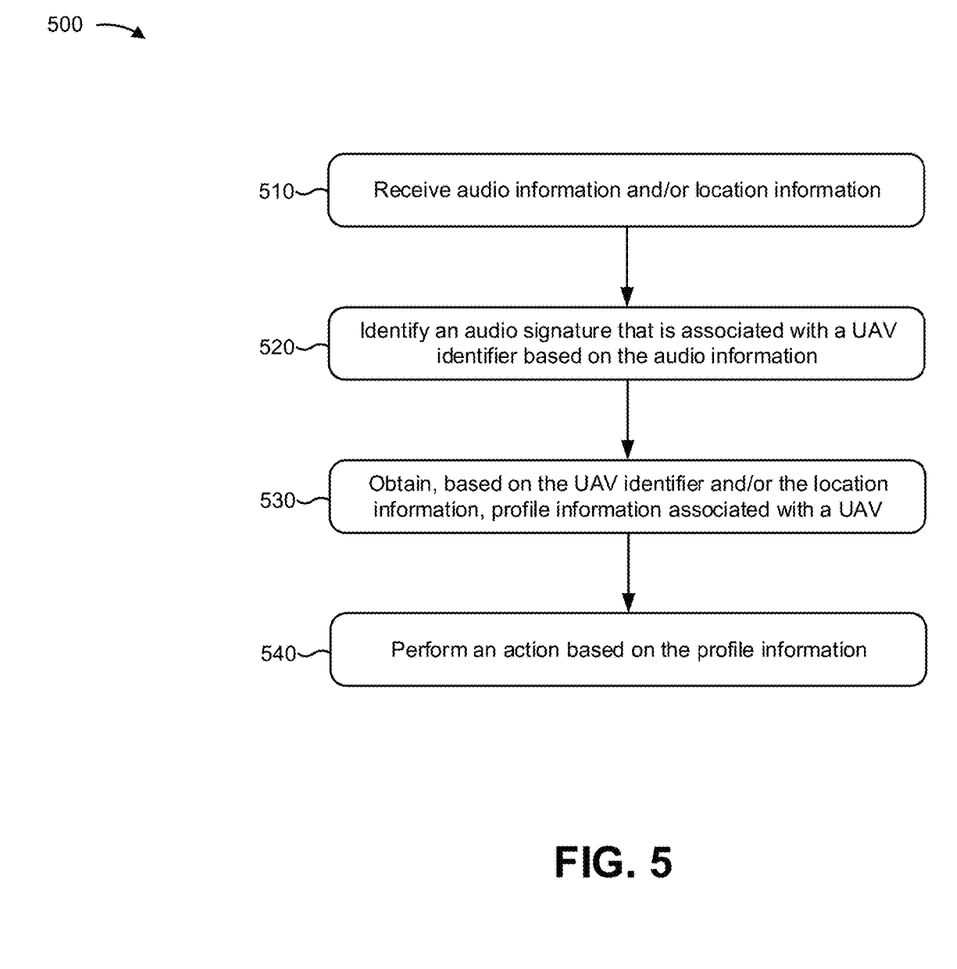
FIG. 5 is a flow chart of an example process for identifying a UAV based on an audio signature determined based on audio emitted by the UAV.

FIG. 5 is a flow chart of an example process 500 for identifying a UAV based on an audio signature determined based on audio emitted by the UAV. In some implementations, one or more process blocks of FIG. 5 may be performed by UAV services platform 230. In some implementations, one or more process blocks of FIG. 5 may be performed by another device or a group of devices separate from or including UAV services platform 230, such as user device 210 and/or UAV 220.

As shown in FIG. 5, process 500 may include receiving audio information and/or location information (block 510). For example, UAV services platform 230 may receive audio information and/or location information associated with a UAV 220 and/or user device 210. In some implementations, UAV services platform 230 may receive audio information from user device 210. For example, user device 210 may record audio information using a microphone associated with user device 210. In some implementations, user device 210 may be associated with an entity that desires information regarding an identity of UAV 220. For example, the entity may include an individual or user who desires information regarding a UAV 220 that is flying over private property of the user. In some implementations, user device 210 may be associated with or have access to an application that permits user device 210 to identify UAV 220. For example, the application may facilitate communication with UAV services platform 230 via a cellular network associated with user device 210 and/or UAV 220. The audio information may include an audio signature that is generated based on a UAV identifier associated with UAV 220.

In some implementations, UAV services platform 230 may receive location information from user device 210 and/or UAV 220. For example, user device 210 may provide location information based on a geolocation component of user device 210. Additionally, or alternatively, UAV services platform 230 may determine a location associated with UAV 220. For example, UAV services platform 230 may determine the location associated with UAV 220 based on UAV services platform 230 controlling a flight of UAV 220. As another example, UAV services platform 230 may determine the location associated with UAV 220 based on a flight plan associated with UAV 220. As still another example, a geolocation component of UAV 220 may provide the location information to UAV services platform 230. In such a case, UAV services platform 230 may determine the location associated with UAV 220 based on the geolocation component-provided location information. In some implementations, the location information may permit more accurate identification of UAV 220.

As further shown in FIG. 5, process 500 may include identifying an audio signature that is associated with a UAV identifier based on the audio information (block 520). For example, UAV services platform 230 may identify an audio signature included in or based on the audio information. In some implementations, the audio signature may be associated with the UAV identifier. For example, the audio signature may be generated based on the UAV identifier. UAV services platform 230 may process the audio signature to obtain the UAV identifier associated with the profile information of UAV 220. For example, UAV services platform 230 may demodulate the audio signature, based on a base audio signature, to identify the UAV identifier.

Thus, the audio signature permits identification of the UAV identifier by user device 210, which in turn permits identification of UAV 220 based on the UAV identifier. In some implementations, UAV services platform 230 may receive a UAV identifier from user device 210 (e.g., when user device 210 decodes the audio signature to determine the UAV identifier), which conserves processor resources of UAV services platform 230 that would otherwise be used to process the audio signature.

In some implementations, UAV services platform 230 may identify the audio signature based on information associated with the audio signature and included in the audio information. For example, UAV services platform 230 may identify the audio signature based on a particular sound to mark a start and/or end of the audio signature in the audio information.

In some implementations, UAV services platform 230 may identify multiple, different audio signatures associated with the audio information. For example, when multiple, different UAVs 220 are located nearby (e.g., with audial range of) user device 210, user device 210 may record audio signatures corresponding to each of the multiple, different UAVs 220. In such a case, UAV services platform 230 may determine UAV identifiers corresponding to each of the multiple, different UAVs 220 based on the audio information. In some implementations, UAV services platform 230 may determine a UAV identifier for a UAV 220, of multiple UAVs 220, that is located nearest to user device 210.

As further shown in FIG. 5, process 500 may include obtaining, based on the UAV identifier and/or the location information, profile information associated with a UAV (block 530). For example, UAV services platform 230 may obtain, based on the UAV identifier and/or the location information, profile information associated with UAV 220. In some implementations, UAV services platform 230 may store or have access to profile information associated with UAV 220. For example, UAV services platform 230 may obtain the profile information associated with UAV 220 based on the registration process described in connection with FIG. 4 above.

In some implementations, UAV services platform 230 may identify the profile information based on the profile information being associated with the UAV identifier and/or the audio signature. For example, when UAV services platform 230 processes the audio signature to determine the UAV identifier, UAV services platform 230 also may identify the profile information based on the UAV identifier. When UAV services platform 230 decodes the audio signature to determine the UAV identifier, UAV services platform 230 conserves storage space that would otherwise be used to store audio signatures for use as UAV identifiers.

In some implementations, UAV services platform 230 may use the audio signature as a UAV identifier. In such a case, UAV services platform 230 may identify the profile information based on the audio signature. When UAV services platform 230 uses the audio signature as a UAV identifier, UAV services platform 230 conserves processor resources that would otherwise be used to decode the audio signature.

In some implementations, UAV services platform 230 may obtain profile information based on location information. For example, UAV services platform 230 may identify a location of user device 210 from which the audio signature was received, and may compare the location of user device 210 to a flight plan associated with UAV 220 to determine whether the proper UAV 220 was identified. Additionally, or alternatively, UAV services platform 230 may obtain location information that identifies locations of user device 210 and UAV 220. UAV services platform 230 may determine whether user device 210 and UAV 220 are located within a particular distance of each other, and may select UAV 220 when user device 210 and UAV 220 are located within the particular distance of each other. Additionally, or alternatively, UAV services platform 230 may determine a velocity and/or direction of travel associated with UAV 220, and may use the velocity and/or direction of travel to select the profile information to be obtained (e.g., based on Doppler shift effects associated with the audio signature). In this way, UAV services platform 230 may be able to identify UAV 220 when audio quality of the audio signature is poor or when interference is present in the audio signature.

In some implementations, UAV services platform 230 may obtain profile information based on a direction associated with user device 210. For example, assume that a first UAV 220 is located north of user device 210, and assume that a second UAV 220 is located south of user device 210. Assume further that user device 210 records audio information that includes audio signatures associated with the first UAV 220 and the second UAV 220. In such a case, UAV services platform 230 may select a selected UAV 220, of the first UAV 220 and the second UAV 220, for which to provide profile information. For example, UAV services platform 230 may determine whether user device 210 is facing north or south (e.g., based on location information associated with user device 210). UAV services platform 230 may select the first UAV 220 as the selected UAV 220 when user device 210 is facing north, and may select the second UAV 220 as the selected UAV 220 when user device 210 is facing south. Thus, accuracy of selection of UAVs 220 for which to provide profile information is improved.

As further shown in FIG. 5, process 500 may include performing an action based on the profile information providing the profile information (block 540). For example, UAV services platform 230 may provide the profile information. In some implementations, UAV services platform 230 may provide the profile information to user device 210 from which the audio signature was received. Providing the profile information to user device 210 from which the audio signature was received permits user device 210 to identify UAV 220 based on the profile information. Additionally, or alternatively, UAV services platform 230 may provide the profile information to an entity associated with UAV services platform 230. Providing the profile information to the entity associated with UAV services platform 230 permits the entity to audit locations of UAV 220, and to track concerns of individuals regarding UAV 220. In some implementations, UAV services platform 230 may provide profile information for multiple, different UAVs 220 (e.g., when the audio information includes audio signatures corresponding to the multiple, different UAVs 220).

In some implementations, UAV services platform 230 may provide information indicating whether UAV 220 is associated with an onboard sensor. The information indicating whether UAV 220 is associated with an onboard sensor may identify the type of sensor and/or may indicate whether the onboard sensor is being used for collecting information. The information indicating whether UAV 220 is associated with an onboard sensor may identify a purpose or use of the onboard sensor (e.g., for navigation, surveying, or the like).

In some implementations, UAV services platform 230 may provide a notification based on the profile information. For example, UAV services platform 230 may dispatch a technician to a location of the UAV 220, may notify police or an aviation administrator of a location of UAV 220, may update profile information of UAV 220 (e.g., to identify locations in which UAV 220 has been detected), or the like. As another example, UAV services platform 230 may cause a flight plan of UAV 220 to be updated (e.g., to avoid a particular area, to be routed to a particular area, to be routed away from an area in which user device 210 is located, etc.).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, when UAV services platform 230 identifies UAV 220 based on the audio signature, and provides the profile information for UAV 220 to user device 210, UAV services platform 230 permits UAV 220 to be identified in the field without relying on visual identification, improves adherence of UAV 220 to flight paths, and permits verification of UAV 220—provided location information (based on a location of the user device). When UAV services platform 230 identifies UAV 220 based on the audio signature, and provides the profile information for UAV 220 to user device 210, UAV services platform 230 also permits identification of UAV 220 at a longer range than some other methods of identification, such as near-field communication (NFC), identifiers printed on the UAV, or the like.

In some implementations, UAV services platform 230 may provide collision avoidance services for UAVs 220 that are associated with profile information. For example, the profile information for a particular UAV 220 may indicate a UAV device type associated with the particular UAV 220 (e.g., fixed-wing, hovering, etc.). Furthermore, UAV services platform 230 may provide control and/or command functionality for UAVs 220 that have provided profile information to UAV services platform 230. As one example, UAV services platform 230 may track locations associated with UAVs 220. When two UAVs 220 are within a threshold distance of each other, UAV services platform 230 may determine a collision avoidance maneuver for the two UAVs 220. Furthermore, UAV services platform 230 may prioritize network traffic associated with the collision avoidance maneuver so that the UAVs 220 perform the collision avoidance maneuver with sufficient time to avoid collision. For example, the collision avoidance maneuver may be based on the device types associated with the two UAVs 220 (e.g., a hovering UAV 220 may be instructed to move upward or downward to avoid a collision with a fixed-wing UAV 220, or a fixed-wing UAV 220 may be instructed to change a heading to avoid a collision with another UAV 220). By identifying the collision avoidance maneuver and prioritizing network traffic associated with the collision avoidance maneuver, UAV services platform 230 improves safety of UAVs 220 and reduces a likelihood that instructions associated with collision avoidance maneuvers are delayed due to network conditions or other network traffic.

In some implementations, UAV services platform 230 may provide secure identification services for UAVs 220 that are associated with profile information. For example, an airspace participant may establish a profile for UAV 220, and may provide a public key associated with the airspace participant. UAV services platform 230 may store the public key in association with the profile information. When the airspace participant generates a flight plan request to request that a flight plan be registered for UAV 220, the airspace participant may sign the flight plan request using a private key corresponding to the public key. The airspace participant may provide the flight plan request to an airspace service provider that approves or disapproves flight plans, such as the Federal Aviation Administration, an air traffic controller, or the like. The airspace service provider may transmit the flight plan request, including the signature associated with the flight plan request, to UAV services platform 230. UAV services platform 230 may verify the authenticity of the flight plan request based on the public key. When UAV services platform 230 determines that the flight plan request is authentic, UAV services platform 230 may cause a certificate to be issued with regard to the flight plan, indicating to the airspace service provider that the flight plan was signed by a valid key. In this way, UAV services platform 230 improves security of flight plan approval and certification, thereby improving safety of UAVs 220.

In some implementations, UAV services platform 230 may provide anomaly detection and fraud prevention for UAVs 220 associated with UAV services platform 230. For example, UAV services platform 230 may store information identifying past and/or future flight information associated with UAV 220 (e.g., flight paths, flight floors or ceilings, hours of operation, typical maneuvers, maximum or minimum speeds, locations at which UAV 220 refuels or recharges, etc.). UAV services platform 230 may obtain information that identifies current behavior of UAV 220 (e.g., GPS information, speed information, maximum acceleration, etc.). Based on the information that identifies the current behavior, UAV services platform 230 may determine whether UAV 220 is performing an anomalous behavior. For example, when UAV 220 is controlled by a malicious party, behavior of UAV 220 may deviate from expected behavior based on the past and/or future flight information. UAV services platform 230 may compare the current behavior to the past and/or future flight information to identify anomalous behavior (e.g., based on a machine learning algorithm, a predictive algorithm, etc.). When UAV services platform 230 detects anomalous behavior, UAV services platform 230 may notify a party associated with UAV 220, may deactivate UAV 220, may notify a law enforcement official, may route other UAVs 220 away from UAV 220, or the like. In this way, UAV services platform 230 detects compromised UAVs and modifies behavior of the compromised UAVs or other devices, which improves safety of UAV 220.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more memories; and
one or more processors, communicatively coupled to the one or more memories, to:
receive profile information corresponding to an unmanned aerial vehicle (UAV),
the profile information identifying a client associated with the UAV;
assign a UAV identifier to the UAV,
the UAV identifier being associated with the profile information;
generate an audio signature based on the UAV identifier,
the audio signature being associated with a sound to be emitted by the UAV,
the audio signature being assigned based upon the UAV identifier, and
the UAV identifier being encoded into the audio signature;
provide the audio signature to the UAV for emission during operation of the UAV;
receive audio information that includes the audio signature,
the audio information being received from a second device,
the second device to record the audio signature,
the second device being associated with an application to identify the UAV,
the application facilitating communication between the first device and the second device,
the second device being associated with an entity that desires information to identify the client associated with the UAV, and
the second device being a user device,
the user device being:
a mobile phone,
a laptop computer,
a tablet computer,
a handheld computer, or
a wearable communication device;
receive location information associated with the second device;
identify the UAV identifier based on the audio information and the location information associated with the second device,
the UAV identifier being identified based on the audio signature that is included in the audio information;
obtain information identifying the UAV that is associated with the UAV identifier; and
perform an action based on the information identifying the UAV,
the action including providing the profile information identifying the client associated with the UAV to the second device.

2. The first device of claim 1, where the profile information identifies one or more of:
an entity that owns or operates the UAV,
an area in which the UAV is permitted to operate,
an area in which the UAV is not permitted to operate,
a flight plan of the UAV,
a make or model of the UAV, or
a purpose or task associated with the UAV.

3. The first device of claim 1,
where the one or more processors are further to:
identify the UAV based on the UAV identifier and based on the location information associated with the second device.

4. The first device of claim 3, where the one or more processors, when identifying the UAV, are to:
identify the UAV based on comparing a flight plan associated with the UAV to the location information associated with the second device.

5. The first device of claim 1, where the one or more processors, when performing the action, are to:
transmit a notification to an entity associated with the UAV based on obtaining the information identifying the UAV.

6. The first device of claim 1, where the one or more processors, when performing the action, are to:
obtain information identifying a location of the UAV; and
provide the information identifying the location of the UAV.

7. The first device of claim 1, where the one or more processors, when performing the action, are to:
determine whether the UAV is associated with an onboard sensor; and
provide information that indicates whether the UAV is associated with the onboard sensor.

8. A non-transitory computer-readable medium storing instructions, the instructions comprising:
one or more instructions that, when executed by one or more processors, cause the one or more processors of a first device to:
receive profile information corresponding to an unmanned aerial vehicle (UAV),
the profile information identifying a client associated with the UAV;
assign a UAV identifier to the UAV,
the UAV identifier being associated with the profile information;
generate an audio signature based on the UAV identifier,
the audio signature being associated with a sound to be emitted by the UAV,
the audio signature being assigned based upon the UAV identifier, and
the UAV identifier being encoded into the audio signature;
provide the audio signature to the UAV;
the UAV to emit audio based on the audio signature;
receive audio information that includes the audio signature,
the audio information being received from a second device,
the second device to record the audio signature,
the second device being associated with an application to identify the UAV,
the application facilitating communication between the first device and the second device,
the second device being associated with an entity that desires information to identify the client associated with the UAV, and
the second device being a user device,
the user device being:
a mobile phone,
a laptop computer,
a tablet computer,
a handheld computer, or
a wearable communication device;

receive location information associated with the second device;

identify the UAV based on the audio signature,
the UAV being identified based on the UAV identifier that is encoded into or determined based on the audio signature and based on the location information associated with the second device;

obtain the profile information associated with the UAV based on the UAV identifier; and perform an action based on the profile information,
the action including providing the profile information identifying the client associated with the UAV to the second device.

9. The non-transitory computer-readable medium of claim 8, where the one or more instructions, that cause the one or more processors to identify the UAV, cause the one or more processors to:
identify the UAV based on comparing a location associated with the UAV to a location associated with the second device from which the audio information was received.

10. The non-transitory computer-readable medium of claim 8, where the one or more instructions, that cause the one or more processors to identify the UAV, cause the one or more processors to:
identify the UAV based on comparing a flight plan associated with the UAV to a location associated with the second device from which the audio information was received.

11. The non-transitory computer-readable medium of claim 8, where the one or more instructions, when executed by the one or more processors, further cause the one or more processors to:
obtain information identifying one or more of a location associated with the UAV or a velocity of the UAV; and
where the one or more instructions, that cause the one or more processors to provide the profile information, cause the one or more processors to:
provide information that identifies the location associated with the UAV or the velocity of the UAV.

12. The non-transitory computer-readable medium of claim 8, where the one or more instructions, that cause the one or more processors to provide the profile information, cause the one or more processors to:
provide information identifying one or more onboard sensors associated with the UAV.

13. The non-transitory computer-readable medium of claim 8, where the one or more instructions, that cause the one or more processors to perform the action, cause the one or more processors to:
provide the profile information,
the profile information identifying one or more of:
an entity that owns or operates the UAV,
an area in which the UAV is permitted to operate,
an area in which the UAV is not permitted to operate,
a flight plan of the UAV,
a make or model of the UAV, or
a purpose or task associated with the UAV.

14. The non-transitory computer-readable medium of claim 8, where the one or more instructions, that cause the one or more processors to receive the profile information corresponding to the UAV, cause the one or more processors to:
receive the profile information based on:
a collision avoidance service,
a secure communication service, or
a flight tracking service.

15. A method, comprising:
receiving, by a device, profile information corresponding to an unmanned aerial vehicle (UAV),
the profile information identifying a client associated with the UAV;
assigning, by the device, a UAV identifier to the UAV,
the UAV identifier being associated with the profile information;
generating, by the device, an audio signature based on the UAV identifier,
the audio signature being associated with a sound to be emitted by the UAV,
the audio signature being assigned based upon the UAV identifier, and
the UAV identifier being encoded into the audio signature;
providing, by the device, the audio signature to the UAV for emission during operation of the UAV;
receiving, by the device, audio information that includes the audio signature,
the audio signature being received from a second device,
the second device to record the audio signature,
the second device being associated with an application to identify the UAV,
the application facilitating communication between the device and the second device,
the second device being associated with an entity that desires information to identify the client associated with the UAV, and
the second device being a user device,
the user device being:
a mobile phone,
a laptop computer,
a tablet computer,
a handheld computer, or
a wearable communication device;
receiving, by the device, location information associated with the second device identifying, by the device, the UAV based on the audio signature,
the UAV being identified based on the UAV identifier that is encoded into or determined based on the audio signature;
obtaining, by the device, the profile information associated with the UAV based on the UAV identifier; and
performing, by the device, an action based on the profile information,
the action including providing the profile information identifying the client associated with the UAV to the second device.

16. The method of claim 15, where the device is a first device; and
where identifying the UAV comprises:
identifying the UAV based on a location associated with the second device,
the audio information being received from the second device.

17. The method of claim 16, where receiving the profile information further comprises:
receiving a flight plan associated with the UAV; and
where identifying the UAV comprises:
identifying the UAV based on the location information associated with the second device and based on the flight plan.

18. The method of claim 16, where performing the action comprises:
   identifying a time at which the UAV is to be located at the location associated with the second device; and
   providing information identifying the time.

19. The method of claim 15, where performing the action comprises:
   determining whether the UAV is associated with an onboard sensor; and
   providing information that indicates whether the UAV is associated with the onboard sensor.

20. The method of claim 15, where performing the action comprises:
   providing the profile information,
      the profile information identifying one or more of:
         an entity that owns or operates the UAV,
         an area in which the UAV is permitted to operate,
         an area in which the UAV is not permitted to operate,
         a flight plan of the UAV,
         a make or model of the UAV, or
         a purpose or task associated with the UAV.

* * * * *